(12) United States Patent
Aijaz et al.

(10) Patent No.: US 10,999,866 B2
(45) Date of Patent: May 4, 2021

(54) RELIABLE AND DETERMINISTIC WI-FI FOR INDUSTRIAL CONTROL APPLICATIONS

(71) Applicant: Kabushiki Kaisha Toshiba, Minato-ku (JP)

(72) Inventors: Adnan Aijaz, Bristol (GB); Parag Kulkarni, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 226 days.

(21) Appl. No.: 15/974,124

(22) Filed: May 8, 2018

(65) Prior Publication Data
US 2019/0349986 A1    Nov. 14, 2019

(51) Int. Cl.
| | | |
|---|---|---|
| *H04W 74/02* | (2009.01) | |
| *H04W 74/00* | (2009.01) | |
| *H04W 28/04* | (2009.01) | |
| *H04L 5/00* | (2006.01) | |
| *H04W 76/15* | (2018.01) | |
| *H04W 72/12* | (2009.01) | |
| *H04L 1/08* | (2006.01) | |
| *H04W 12/06* | (2021.01) | |
| *H04L 12/44* | (2006.01) | |
| *H04W 84/12* | (2009.01) | |

(52) U.S. Cl.
CPC ............... *H04W 74/02* (2013.01); *H04L 1/08* (2013.01); *H04L 5/0007* (2013.01); *H04W 12/06* (2013.01); *H04W 28/04* (2013.01); *H04W 72/121* (2013.01); *H04W 72/1231* (2013.01); *H04W 74/006* (2013.01); *H04W 76/15* (2018.02); *H04L 12/44* (2013.01); *H04W 84/12* (2013.01)

(58) Field of Classification Search
CPC ..... H04W 36/06; H04W 36/08; H04W 48/20; H04W 72/0426; H04W 88/08; H04W 88/10; H04W 72/12; H04W 72/1226
See application file for complete search history.

(56) References Cited

U.S. PATENT DOCUMENTS

| | | | |
|---|---|---|---|
| 2012/0033684 A1 | 2/2012 | Mosko | |
| 2013/0103795 A1* | 4/2013 | Kulkarni | H04L 67/125 709/217 |
| 2013/0156016 A1* | 6/2013 | Debnath | H04W 72/0406 370/336 |
| 2016/0316472 A1* | 10/2016 | Kwon | H04W 12/06 |
| 2017/0070914 A1* | 3/2017 | Chun | H04L 5/0053 |

(Continued)

OTHER PUBLICATIONS

G. Cena, S. Scanzio, and A. Valenzano, "Seamless Link-Level Redundancy to Improve Reliability of Industrial Wi-Fi Networsk," in *IEEE Transactions on Industrial Informatics*, vol. 12, No. 2, Apr. 2016, pp. 608-620.

*Primary Examiner* — Otis L Thompson, Jr.
(74) *Attorney, Agent, or Firm* — Oblon, McClelland, Maier & Neustadt, L.L.P.

(57) ABSTRACT

A WiFi system comprising two or more access points operating in the same network and a plurality of nodes. Each node is in communicative association with each access point. A plurality of nodes transmits data in a scheduled communication with a first access point of the two or more access points and subsequently re-transmits some or all of the data in a scheduled communication with a second access point of the two or more access points.

15 Claims, 8 Drawing Sheets

(56) References Cited

U.S. PATENT DOCUMENTS

| | | | |
|---|---|---|---|
| 2017/0359774 A1* | 12/2017 | Lu | H04W 48/16 |
| 2018/0205510 A1* | 7/2018 | Kwon | H04W 74/0816 |
| 2018/0376418 A1* | 12/2018 | Li | H04W 52/0216 |
| 2019/0281608 A1* | 9/2019 | Huang | H04L 45/20 |
| 2019/0342891 A1* | 11/2019 | Asterjadhi | H04W 72/0413 |
| 2019/0387435 A1* | 12/2019 | Cariou | H04W 80/02 |

* cited by examiner

RELIABLE AND DETERMINISTIC WI-FI FOR INDUSTRIAL CONTROL APPLICATIONS

FIELD

Embodiments described herein relate generally to communication in WiFi systems comprising at least two access points.

BACKGROUND

Communication in industrial environments often demands high reliability, low latency, and good scalability. Traditionally, wired technologies like fieldbus systems and industrial Ethernet have served the communication requirements of industrial applications. However, such solutions usually incur high installation and maintenance costs. Wireless technologies provide a low-cost alternative with a number of additional benefits such as fast installation and commissioning, higher flexibility, mobility support, and increased personal safety. Wireless technologies are expected to play a crucial role in realising the vision of the fourth industrial revolution.

IEEE 802.11-based wireless local area networks (WLANs), also known as Wi-Fi networks, are presently deemed ineligible for industrial communication due to two main limitations. First, legacy WLANs lack determinism as access to the networks is random and not guaranteed. Moreover, legacy WLANs cannot guarantee that a particular desired latency is achievable. This is due to the underlying channel access mechanism at the medium access control (MAC) layer which is based on IEEE 802.11 distributed coordination function (DCF) i.e., carrier sense multiple access with collision avoidance (CSMA/CA). The randomness associated with channel access procedure prohibits deterministic delay guarantees. Second, legacy WLANs are not reliable enough for industrial communication. This is mainly due to collisions arising from contention-based medium access. Moreover, techniques like time slotted channel hopping (TSCH), which are desirable in fulfilling the stringent requirements of industrial communications, cannot be easily applied.

Wi-Fi offers a number of benefits as compared to conventional IEEE 802.15.1 and IEEE 802.15.4 solutions which are frequently employed in industrial environments. First, Wi-Fi supports much higher data rates which directly translate to reduction in transmission latency. Second, with Wi-Fi based Physical (PHY) layer, higher payload can be transmitted per timeslot. This provides the opportunity of implementing robust channel coding techniques for enhanced reliability without incurring additional latency. Third, the PHY layer in conventional Wi-Fi standards is based on orthogonal frequency division multiplexing (OFDM) which is much more robust to multi-path fading. Fourth, Wi-Fi provides higher coverage than 802.15.1-based or 802.15.4-based solutions.

In the following, embodiments will be described with reference to the drawings in which.

DETAILED DESCRIPTION

According to an embodiment there is provided a WiFi system comprising two or more access points operating in the same network and a plurality of nodes. Each node is in communicative association with each access point. A plurality of nodes transmits data in a scheduled communication with a first access point of the two or more access points and subsequently re-transmits some or all of the data in a scheduled communication with a second access point of the two or more access points.

When referring to two access points reference to arrangements in which such two access points are included in a plurality of access points greater than two.

Whilst the access points operate in the same network, they use different communication channels within this network.

The schedule may allocated individual time slots to each node in a group. Within each time slot time for downlink and uplink transmission may be scheduled.

All of the data may be re-transmitted to the second access point.

The data transmission may be bi-directional. A time slot for bi-directional data transmission may have contiguous sub-timeslots for respective uplink and downlink transmissions. The data transmission may be triggered by a beacon signal received from access point.

The system may be an industrial communications system.

Each node may use only a single radio.

The system may be configured to determine one or more of nodes for which the data transmission to the first access point was successful and nodes for which the data transmission to the first access point was not successful and to schedule the re-transmission to the second access point only for nodes that were determined to have not succeeded in transmitting the data to the first access point.

The schedule may be provided to the nodes by at least one of the first access point, the second access point and a network controller controlling the first and second access points.

Data transmission may rely on OFDMA and a schedule for the transmission may be generated on the basis of channel state information acquired from nodes within the network.

The nodes may be configured to pad data for transmission so that, under currently prevailing transmission conditions, a predetermined transmission duration is met.

An access point may transmit the predetermined transmission duration to the node in a downlink transmission.

The current transmission conditions may be influence by the current quality/state of the channel and/or by the transmission parameters chosen by the node.

The access point may determine the duration of the transmission by acquiring instantaneous channel state information, mapping it to a modulation and coding scheme, and calculation of the instantaneous data rate.

One or more of the plurality of nodes may be configured to transmit the channel state information to an access point of the two or more access points following receipt, from an access point of the two or more access points, of a request to provide channel state information.

The request may be a trigger frame that requests channel state information from one or more of the nodes.

An access point of the two or more access points may transmit information identifying a plurality of nodes scheduled for simultaneous data transmission to the nodes.

An access point of the two or more access points may poll nodes in the scheduled communication, where each node responds to a received polling message with a data transmission to the access point.

According to another embodiment there is provided a WiFi system comprising two or more access points operating in the same network and a plurality of nodes. The plurality of nodes are grouped in a plurality of groups, wherein nodes in a group of nodes are in scheduled communication with a first access point of the two or more access points while nodes in another group of nodes are in scheduled communication with a second access point of the two or more access points.

In an embodiment no node is a member of more than one group, so that an access point that is in communicative connection with one group of nodes does not exchange data with any other group of nodes whilst it is in communicative connection with the one group of nodes.

According to another embodiment there is provided a method of operating a WiFi system comprising two or more access points operating in the same network and a plurality of nodes. Each node is in communicative association with each access point. The method comprises transmitting data from a plurality of nodes in a scheduled communication with a first access point of the two or more access points and subsequently re-transmitting some or all of the data in a scheduled communication with a second access point of the two or more access points.

According to another embodiment there is provided a method of operating a WiFi system comprising two or more access points operating in the same network and a plurality of nodes, wherein the plurality of nodes are grouped in a plurality of groups. The method comprises performing scheduled communication between a first access point of the two or more access points and a nodes in a group of nodes while performing scheduled communication between a second access point of the two or more access points and nodes in another group of nodes.

According to another embodiment there is provided a node for use in a system comprising a plurality of nodes and two access points with which the node is associated. The node is configured to transmit data to a first one of the two access points and subsequently to re-transmit the data to the second one of the two access points.

According to another embodiment there is provided a method of operating a node for use in a system comprising a plurality of nodes and two access points with which the node is associated. The method comprises transmitting data to a first one of the two access points and subsequently re-transmitting the data to the second one of the two access points.

According to another embodiment there is provided a method of associating a node with two access points in a WiFi system. The method comprises establishing security credentials of the node by authenticating the node with one of the access points, associating the node with the one access point, forwarding the security credentials of the node to another one of the two access points and associating the node with the other one of the two access points.

Forwarding the security credentials of the node to the second access point may allow easy association with the second access point.

The network may comprise a wireless controller. The wireless controller may be configured to control the two access points. The forwarding of the security credentials may comprise transmitting of the security credentials from the one access point to the wireless controller and subsequently transmitting the security credentials from the wireless controller to the other access point.

The other access point, once in receipt of the security credentials, is in the state it would have, according to IEEE 802.11, following standard authentication of a WiFi node with the access point. Therefore, once the security credentials have been received, an access point operating according to the IEEE 802.11 standard has no need to authenticate the node and can simply proceed with responding to an association request from the node. The method consequently eliminates the need for the node to perform authentication with the other access point of the two access points.

One or both of the access points may be configured to regularly send beacon information. The beacon information of one of the access points may comprise priority information that give the access point authentication priority over the other access point in the network. The nodes seeking to participate in the WiFi network may be configured to, based on the priority information, send an authentication request to the access point from which the priority information has been received in preference over other access points.

According to another embodiment there is provided a WiFi system comprising two WiFi access point. At least one of the access points is configured to, after receipt of an authentication request from a node, forward the security credentials of the node to the other access point of the two WiFi access points.

According to another embodiment there is provided a method of associating a WiFi node with two WiFi access points operating in the same network comprising the node. The method comprises sending an authentication request to one of the two WiFi access points, following successful authentication with the one WiFi access point, associating with both WiFi access points without first sending an authentication request to the other WiFi access point of the two WiFi access points.

According to another embodiment there is provided a WiFi node configured to associate itself with two WiFi access points operating in the same network. The node is configured to send an authentication request to one of the two WiFi access points and, following successful authentication with the one WiFi access point, associate itself with both WiFi access points without first sending an authentication request to the other WiFi access point of the two WiFi access points.

According to another embodiment there is provided a method of operating a WiFi access point jointly in a same WiFi network with another WiFi access point. The access point is configured to forward security credentials of a WiFi node that is being or has been authorised for participating in the WiFi network to the other WiFi access point.

According to another embodiment there is provided a WiFi access point for operating jointly in a same WiFi network with another WiFi access point. The access point is configured to forward security credentials of a WiFi node that is being or has been authorised for participating in the WiFi network to the other WiFi access point.

According to another embodiment there is provided a non-volatile storage medium storing computer program instructions for execution by a processor, the computer program instructions configured to cause the processor to perform any of the above mentioned methods.

To improve determinism of Wi-Fi networks, scheduling-like functionality at the MAC layer is desirable. In this respect, techniques like time division multiple access (TDMA) and the IEEE 802.11 point coordination function (PCF) are particularly attractive. TDMA provides dedicated timeslot allocation functionality, whereas PCF allows contention-free periods, preventing collisions and back-offs.

Herein a novel IEEE 802.11-based wireless solution providing reliable and deterministic communication in industrial environments is introduced. Embodiments adopt a hybrid channel access scheme for deterministic communication. Embodiments also adopt a redundancy mechanism for enhanced reliability. Reliable and deterministic communication is provided without relying on dual-band radios. Embodiments are designed for star topology environments e.g., at the field-level of factory automation. Specifically, embodiments include support for more than 100 sensors/actuators while providing a latency of up to 10 ms and a reliability of nearly 99.99%.

Communication in industrial environments demands high reliability and low latency along with good scalability. Wireless technologies are increasingly gaining popularity for many industrial control applications. IEEE 802.11-based wireless local area networks (WLANs), also known as Wi-Fi networks, are deemed ineligible for industrial control applications. This is mainly because WLANs are not reliable enough for industrial applications. Moreover, WLANs lack determinism. This IAR proposes a novel IEEE 802.11-based wireless solution for providing reliable and deterministic communication in industrial environments. State-of-the-art Wi-Fi networks employ orthogonal frequency division multiplexing (OFDM) at the Physical (PHY) layer, whereas the next generation Wi-Fi standard, also known as IEEE 802.11ax, is based on orthogonal frequency division multiple access (OFDMA). Embodiments provide different types of medium access control (MAC) designs that build on OFDM or OFDMA and achieve different levels of efficiency based on the processing overhead. Broadly, such designs can be classified into two categories: (a) MAC designs with pre-defined (physical) time-slotted schedule, and (b) MAC designs with virtual time-slotted schedule.

Embodiments described herein support bi-directional data transmission between a controller and multiple sensors/actuators. However, embodiments can also support unidirectional traffic (e.g., uplink/downlink only) through provisioning at the MAC layer. The MAC design for OFDM-based PHY layer are based on single-user transmissions, i.e., at every transmission a single device is active. However, the MAC design for OFDMA-based PHY layer enables multi-user transmissions.

Figure 1:
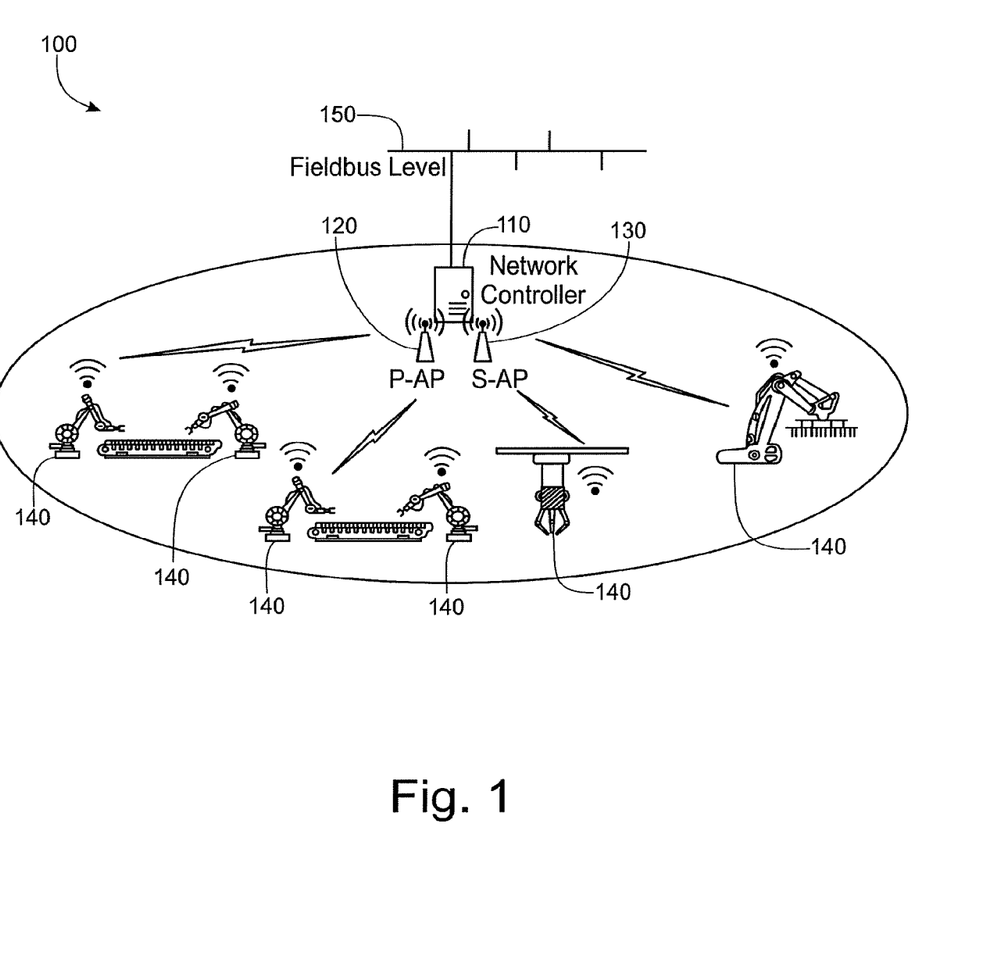
FIG. 1 shows a network in which embodiments may be implemented.

In the following a single-cell scenario, as depicted in FIG. 1, is considered. Wireless connectivity is provided between an automation system controller and multiple sensors/actuators. Embodiments use two different access points. In embodiments the network controller includes the automation system controller (e.g., programmable logic controller) and the wireless system controller which handles the operation of multiple access points.

Embodiments use two APs: a primary AP (P-AP), and a secondary AP (S-AP). Both the APs are connected to the wireless system controller through an interface. It will be appreciated that, although only a single wireless system controller is illustrated, the functions of the wireless system controller described herein may be equally be fulfilled by more than one controller. The interface may be a wired interface (e.g., Ethernet). The P-AP and the S-AP operate on different channels but in the same network. The P-AP and the S-AP can be co-located and have different service set identifiers (SSIDs). Both the APs provide overlapping coverage and adjust their transmit powers accordingly. In embodiments the wireless system controller is responsible for IP address assignment. In embodiments time synchronization in the network is achieved through the IEEE 802.11 timing synchronization function (TSF). In embodiments STAs maintain local 1 MHz timers which are periodically synchronized through beacons received from the AP.

Physical (PHY) Layer Design

In one embodiment, the PHY layer is based on OFDM as per the legacy IEEE 802.11 specifications. The MAC layer design in this embodiment is agnostic to the underlying 802.11 variant (e.g., a, g, n, ac).

In another embodiment, the PHY layer is based on OFDMA as per the IEEE 802.11ax specifications. OFDMA divides existing 802.11 channels into smaller sub-channels with a predefined number of subcarriers. The 802.11ax PHY layer keeps the same channel configuration as IEEE 802.11ac, i.e., 20 MHz, 40 MHz, 80 MHz, and non-contiguous and contiguous 160 MHz. Additionally, it supports 2.22 MHz, 5 MHz, and 10 MHz sub-channel widths.

MAC Layer Design and Operation

Different types of MAC designs are adopted in different embodiments. The notion of timeslot is common to all designs. The duration of a timeslot is dependent on the net payload (including headers) and the PHY layer data rate. Table 1 shows a comparison of minimum required timeslot duration for various net payload sizes. Note that this timeslot duration does not account for guard intervals, acknowledgements (ACKs), and IEEE 802.11 interframe space durations.

TABLE 1

Comparison of timeslot duration.

| | PHY Layer Data Rate | | | |
|---|---|---|---|---|
| Net Payload | 1 Mbps | 3 Mbps | 6 Mbps | 54 Mbps |
| 8 Bytes | 64 μs | 21.3 μs | 10.6 μs | 1.2 μs |
| 16 Bytes | 128 μs | 42.7 μs | 21.3 μs | 2.4 μs |
| 128 Bytes | 1024 μs | 341.3 μs | 170.7 μs | 19 μs |
| 256 Bytes | 2048 μs | 682.7 μs | 341.3 μs | 38 μs |

To achieve high reliability, the MAC designs of the embodiments incorporate some form of redundancy. These designs are explained as follows.

TDMA Over DCF

In an embodiment the MAC layer design adopts TDMA over in DCF-based channel access known from standard WiFi/802.11. The use of TDMA provides a centralized medium access mechanism according to a time schedule such that only one node can access the channel in a given timeslot. A wireless controller controlling a primary access point (P-AP) and a secondary access point (S-AP) is responsible for computing a schedule according to any pre-defined criteria e.g., based on round robin approach. The wireless controller is part of a network controller. The network controller further comprises an industrial controller (not shown in the figures) that runs the control applications of the network. The wireless controller and the network controller do not need to be co-located and may interact, thereby forming the network controller.

In order to achieve high reliability, the MAC layer design used in the embodiment provides 100% redundancy (in time domain) through the use of the secondary access point, S-AP, as described in more detail below. In 802.11-based WLANs, a STA can only transmit or receive data if it is in authenticated and associated state. In order to exploit temporal redundancy, STAs must be able to associate with two APs a priori. However, legacy 802.11 protocols do not support this functionality. In the following a method 200 for dual AP association is described with reference to FIG. 2. This method ensures standards-compatibility.

Figure 2:
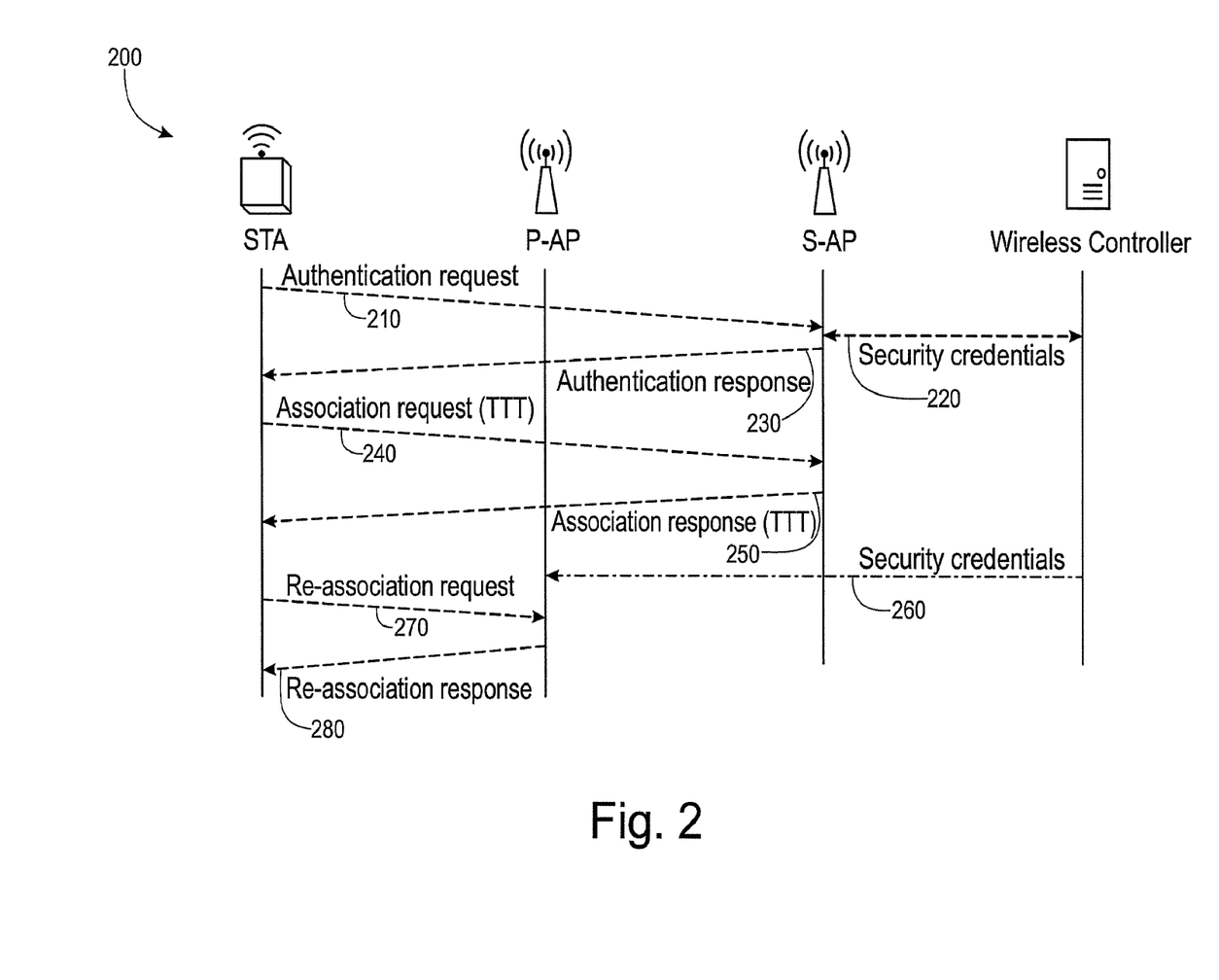
FIG. 2 shows a method of association of a STA with two access points.

In 802.11-based WLANs, data transfer between a STA and an AP cannot take place unless the former is in 'authenticated and associated' state. Initially, both the P-AP and the S-AP transmit beacon frames carrying necessary network information. The S-AP has priority over the P-AP during initial network association as the S-AP is used for temporary redundancy and has to negotiate the TTT parameter (discussed in more detail below) with the P-AP. One way to realise this priority is by embedding some additional information in any of the reserved fields of the beacon frames, for example by embedding the MAC addresses of both the S-AP and the P-AP in the beacon frames sent by both the S-AP and the P-AP in the order of priority and configuring the STAs such that association with the AP identified by the first MAC address is sought first.

Based on the received information, the STAs in the network send respective authentication request frames (step 210) exclusively to the S-AP instead of to the P-AP. The S-AP performs a security check (step 220) with the wireless controller and responds back (step 230) to the requesting STA with an authentication response frame. After authentication, a STA sends (step 240) an association request frame to the S-AP. The association request frame contains a parameter, hereinafter referred to as Target Transmission Time (TTT), which indicates the minimum duration for which the STA will not transmit or receive from the S-AP for the very first time. The calculation of TTT is described further below. The S-AP responds back (step 250) with an association response frame confirming successful negotiation of TTT. Thereafter, the respective STA is successfully associated with the S-AP.

After successful association with the S-AP, the wireless controller transmits (step 260) the association information to the P-AP, so that the P-AP has a priori knowledge of the association of the respective STAs to the S-AP. Once the STA has received confirmation that it is successfully associated with the S-AP, it sends a re-association request frame (step 270) to the P-AP. Since the P-AP has a priori knowledge of the authentication of the respective STA, it does not require re-authentication. As a consequence the P-AP responds back (step 280) with a re-association response frame. From this point onwards the STA is successfully associated to two different Aps, the S-AP and the P-AP. It is emphasised that a STA only transmits and receives data from a single AP at any given time. It is emphasised that, in the embodiment the STA is associated with the two APs before data transmission between the STA and either of the APs has commenced. Moreover, in the embodiment no handover of the STA from one AP to the other AP takes place when data transfer is switched between APs. Instead the STA is simultaneously associated with both APs (although data is only exchanged with one or the other AP at any one time).

When associating itself with the two access points the node is allocated only a single IP address for use in communication with all of the access points.

Figure 3:
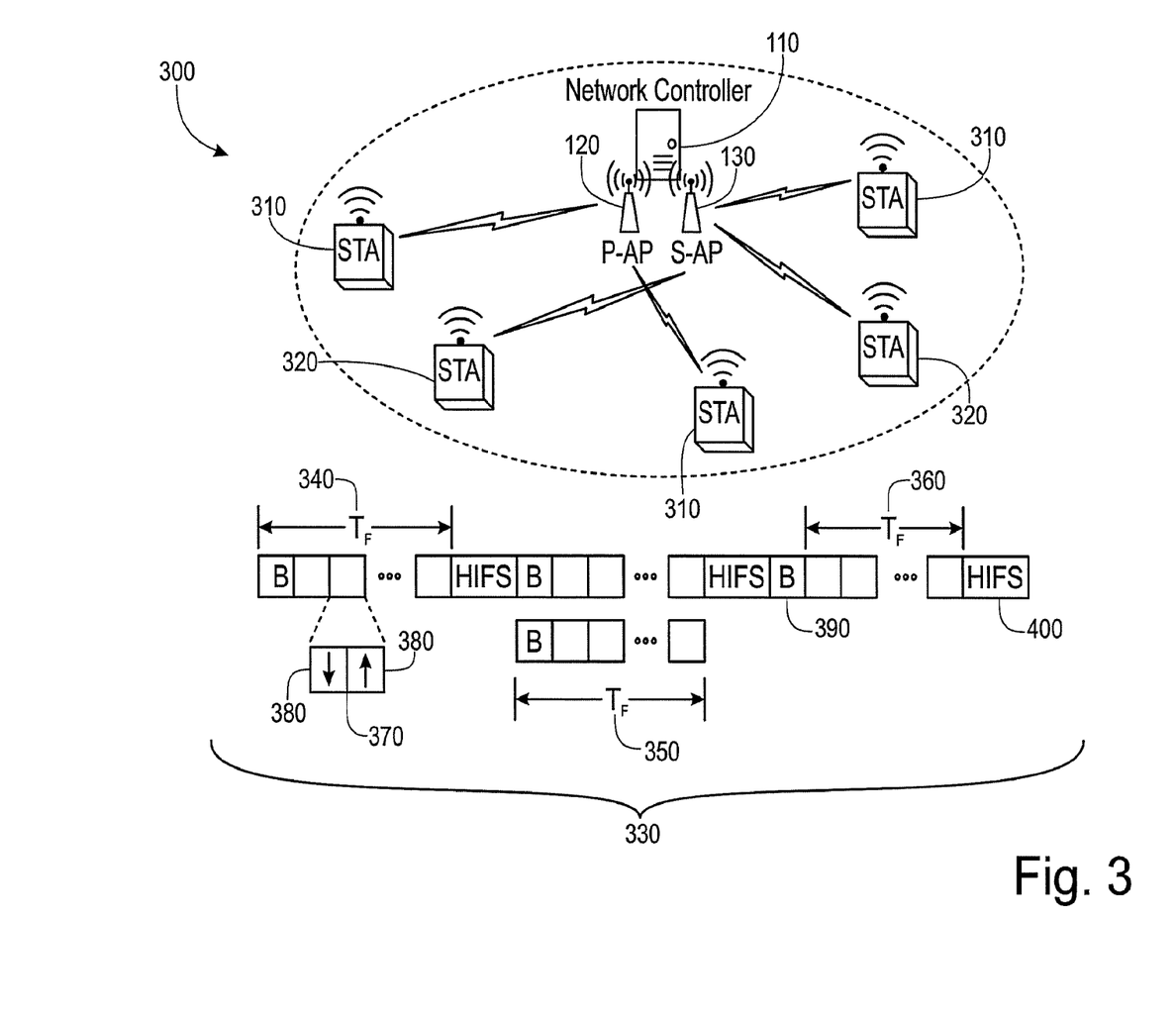
FIG. 3 shows a first embodiment of transmitting data to two access points.

Turning to the MAC design of the embodiment and referring to FIG. 3, let, N denote the total number of STAs 310 and 320 in the network. After the association phase, the wireless controller splits these N STAs into M groups, with M distinct group IDs, based on some pre-defined criteria. The MAC layer super-frame 330 comprises M+1 frames 340, 350 and 360 such that each frame consists of N/2+1 double slots 370. Each double slot 370 consist of two single timeslots 380 to support bi-directional message exchange between the AP and the STA. This scenario for the case of 2 groups of STAs, a first group indicated by reference numerals 310 and a second group indicated by reference numerals 320, is depicted in FIG. 3.

The first double slot 390 of each frame is reserved for the AP to transmit beacon frames. Two adjacent frames in a super-frame are separated by an interframe space (HIFS) duration 400. In an alternative embodiment the HIFS duration is realised as part of the beacon frame 390. In the embodiment the beacon frames 390 also include the schedule information for the STAs 310/320. The schedule information consists of group ID and the allocated timeslot within the frame 340, 350 and 360. Initially, the first group 310 of STAs communicate with the P-AP over the first frame 340. Based on the schedule information, each double slot 370 is allocated to a specific STA. The first timeslot 380 in a double slot is allocated for downlink transmission from the AP 120/130 whereas the second timeslot 380 is allocated for uplink transmission from the STA 310/320. The duration of each single timeslot can be calculated as $$T_{Data}+T_{SIFS}+T_{ACK}+T_{Guard},$$

where TData and TACK denote the transmission time for data and ACK transmissions, and TSIFS and TGuard denote the short inter-frame space (SIFS) duration and guard interval duration, respectively. The bidirectional communication in a double slot 370 can be further optimized through a bidirectional transmit (BDT) feature wherein the STA can transmit the data instead of transmitting an ACK.

After finishing the communication with the P-AP 120, the first group of STAs 310 wait for a fixed duration (H IFS duration) 400 and switch transmission to the S-AP 130. The HIFS duration depends on the channel switching time of the underlying hardware which can be different for hardware from different vendors. The HIFS therefore needs to be configured once when the network is originally configured and depending on the hardware and stays the same throughout the operational lifetime of the network. The HIFS duration 400 is added to allow the STAs to move to the channel of the S-AP 130 to continue the protocol operation. Once transitioned to the channel of the S-AP 130, the STAs 210 follow a similar approach as before and communicate with the S-AP 130 based on the received schedule information from the S-AP 130 in the first double slot of the frame.

Because each STA repeats a transmission originally sent to the P-AP 120 irrespective of the success or failure of the transmission to the P-AP by sending the same transmission to the S-AP 130 the embodiment provides 100% redundancy. While the first group of STAs 310 is communicating with the S-AP 130, the second group of STAs 320 communicates with the P-AP 120. In the third frame 360, the second group of STAs 320 communicates with the S-AP 130 to repeat the transmissions sent to the P-AP in the second frame 350.

The association of the STAs with two APs ensures that there is no need for a non-deterministic delay to account for the association of all the STAs with the respective AP after every frame. In the embodiment the entire super-frame 330 is repeated to account for all retransmissions based on the reliability and latency requirements. The requirement to repeat transmissions exactly as they are carried out on the P-AP subsequently on the S-AP not only provides temporal redundancy but also greatly simplifies implementation.

The above described embodiment provides reliability and simplicity of implementation.

TDMA Over DCF with PCF

Figure 4:
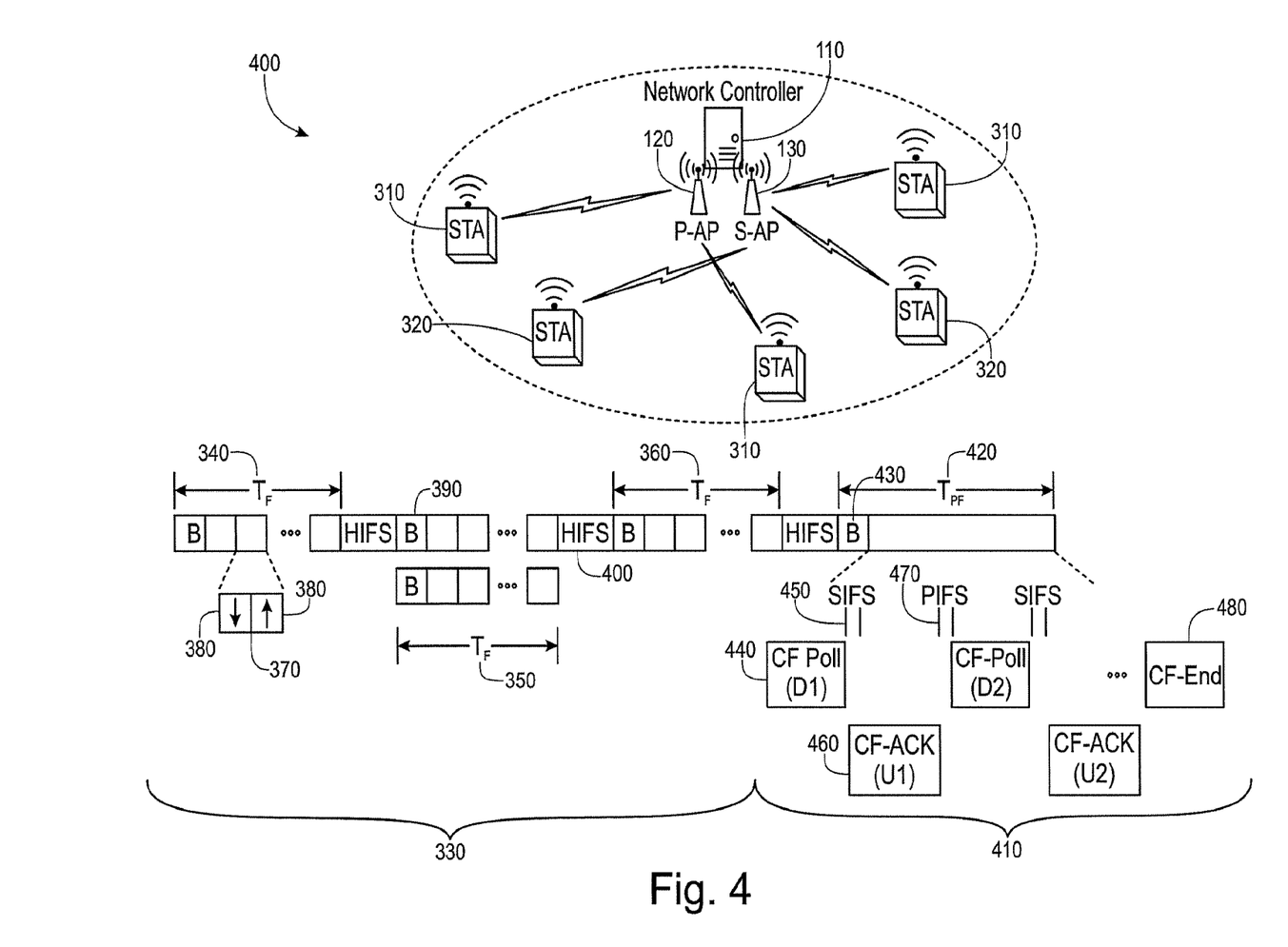
FIG. 4 shows a second embodiment of transmitting data to two access points.

Similar to the above described embodiment of a MAC design a second MAC layer design, described hereinafter with reference to FIG. 4 adopts TDMA over conventional DCF-based channel access. The first super-frame 330 of the second MAC design is similar to that of the above described first MAC design 1 in that it comprises M+1 frames 340, 350, 360 wherein channel access in each frame is provided through TDMA. Besides, parallel operation is performed over both the P-AP 120 and the S-AP 130, as described earlier.

In the second phase 410 the MAC design of the second embodiment adopts PCF-based operation for handling retransmissions. In particular, instead of causing all STAs 310 and 320 to repeat their transmissions in the manner discussed above with reference to the first design 1/FIG. 3, the design of the second embodiment is to selectively cause STAs 310 and 320 whose transmissions did not succeed, to repeat their transmission. A retransmission is needed if either uplink or downlink transmissions fail with both the P-AP 120 and the S-AP 130.

The second phase 410 consists of multiple PCF frames 420. Each PCF frame 420 starts with a beacon 430 indicating that polling will now start. The beacon contains information about STAs 310/320 requiring retransmissions. The re-transmission phase can be handled through the P-AP 120 or the S-AP 130, or through both of them together (or more than two, or all of the, APs participating in the network). In an embodiment in which the P-AP 120 and the S-AP 130 jointly arrange re-transmission the STAs requiring re-transmission are split into a number of groups. This number of groups may correspond to the number of APs participating in the network, or into a lower number, if re-transmission for fewer APs is required. The grouped STAs then re-transmit their data to the AP with which they have been associated. All groups can transmit simultaneously. Preferably the system 400 is set up to store an indication of which AP is responsible for handling retransmissions in each of the STAs 310/320. In this manner no extra signalling is required to let the STAs 310/320 know which AP 120/130 to tune to for retransmissions. After transmitting the beacon 430, the AP 120/130 starts polling the STAs 310/320 (whose transmissions have failed) in a round robin manner. The AP 120/130 transmits a CF-Poll message 440 that contains the downlink message for a STA 310/320. After receiving a CF-Poll message 440, the STA 310/320 waits for SIFS duration 450 and responds back with a CF-ACK message 460 that contains the uplink message for the AP 120/130. The AP 120/130 repeats this operation for the next STA 310/320 after waiting for PCF interframe space (PIFS) duration 470. The PIFS duration is less than the SIFS duration, which is less than the HIFS duration. As the AP waits for PIFS duration it has priority over the STAs (which wait for the SIFS duration before they attempt to access the channel). The longer HIFS duration preceding the beacons 390 allow for channel switching. The polling phase 410 continues until all retransmissions are successful. If some retransmissions fail, they are repeated during this phase 410. The phase 410 is a repetition of phase 330 but is shortened to only accommodate data transmission from those STAs that require re-transmission.

Each PCF frame 420 could also be repeated through a different AP to exploit channel diversity. At the end of the polling phase, the AP sends a CF-End signal 480 to let all STAs 310/320 know that the polling phase has ended and that they should now tune to the P-AP 120 to wait for a beacon 390 to start the next cycle of transmissions. The PCF-based operation for handling retransmissions reduces the cycle-time of the system when compared to the above described first MAC design in which the entire transmission is repeated per default.

In another embodiment the second phase 410 of the MAC design of the second embodiment can also be realised using trigger frames which are currently being considered for next generation WLAN standard IEEE 802.11ax. The trigger frame is employed for soliciting transmission from a single or multiple STAs 310/320.

The above described second embodiment provides reliability and simple implementation but increases efficiency when compared to the first described embodiment.

Window-Based DCF

Figure 5:
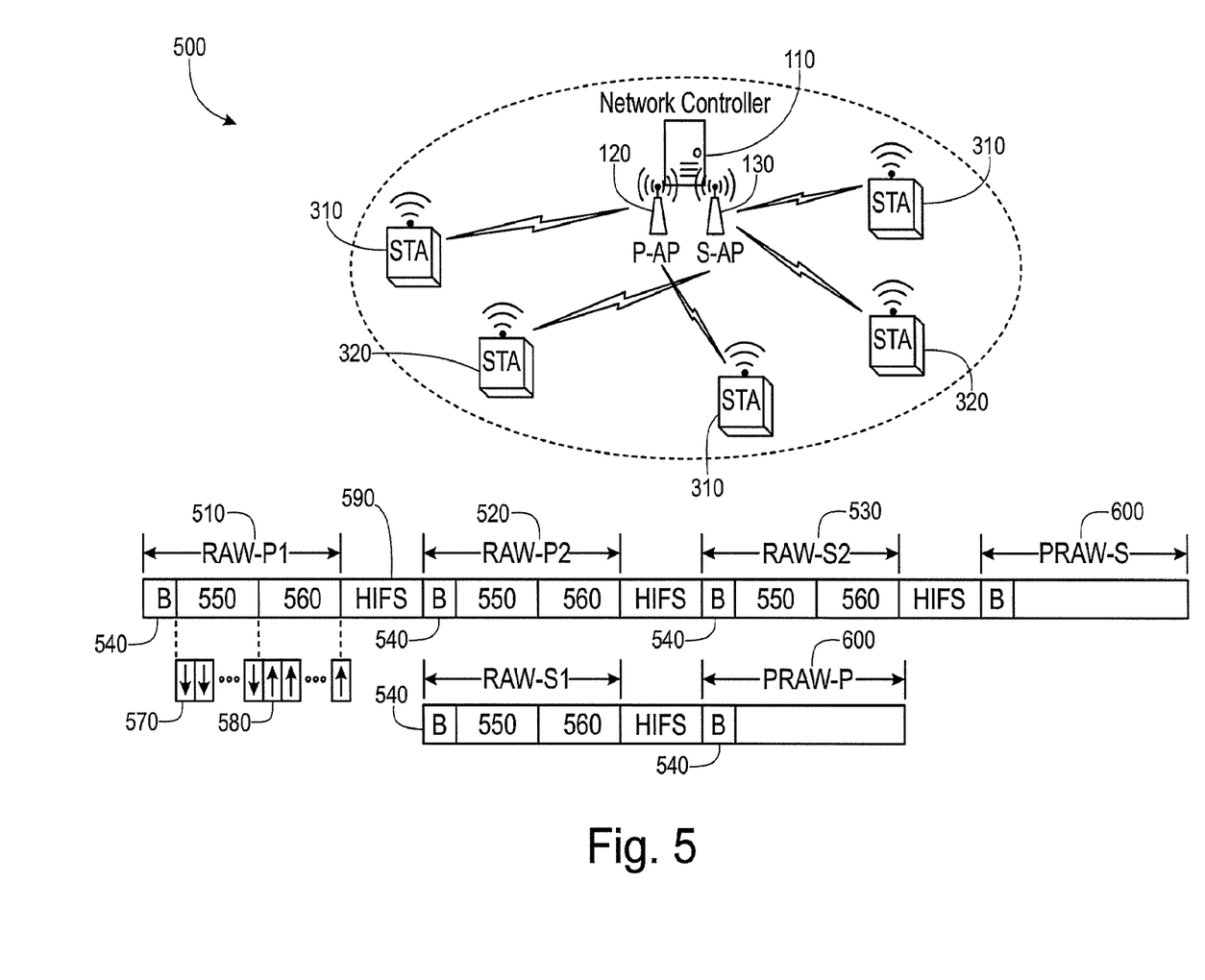
FIG. 5 shows a third embodiment of transmitting data to two access points.

In a MAC layer design according to a third embodiment the concept of restricted access window (RAW) 510, 520, 530 is adopted. Each RAW 510, 520, 530 handles bi-directional communication for a fixed number of STAs 310/320, depending upon the number of groups into which the total number of STAs 310/320 is subdivided. For instance, in case the total number of STAs 310/320 is subdivided into two groups, each RAW 510, 520, 530 handles communication to/from N/2 STAs 310/320. The first slot of each RAW is reserved for transmitting beacon frames 540. Each RAW is split into downlink 550 and uplink 560 sub-frames. The downlink 550 and uplink 560 sub-frames are further split into a fixed number of timeslots 570 and 580 respectively. The beacon 540 contains a traffic information map (TIM) that provides information regarding allocation of timeslots to STAs 310/320. In each timeslot 570 of the downlink sub-frame 550, the AP 120/130 transmits control messages to a specific STA 310/320. The respective STA 310/320 responds back in the allocated timeslot 580 of uplink sub-frame.

Initially, the RAWs 510, 520, 530 are advertised by the P-AP 120. The first group of STAs 310 communicates with the P-AP 120 as shown in FIG. 5. Once the first group of STAs 310 finishes communication with the P-AP 120, it waits for HIFS duration 590 (as discussed above) and switches transmission to the S-AP 130. The STAs 310/320 follow a similar approach as discussed above and communicate with the S-AP 130 based on the received schedule information from the S-AP 130 in the first slot 540 of the frame. While the first group of STAs 310 is communicating with the S-AP 130, the second group of STAs 320 communicates with the P-AP 120. At the end of the second frame 520, the second group of STAs 320 communicates with the S-AP 130 for repeating transmissions. Unlike the first two above described embodiments, the MAC design of the present embodiment has some additional provisioning for uplink only traffic. This is realised through a periodic RAW (PRAW) 600 which contains a fixed number of timeslots for uplink only traffic. The MAC layer retransmissions are handled through the PCF-based operation as described for the TDMA over DCF with PCF MAC design embodiment.

The above described third embodiment provides support for uplink only data transmission.

Virtual TDMA

Conventional Wi-Fi networks employ an OFDM-based PHY layer and DCF-based MAC layer. To achieve deterministic communication, embodiments overlay a time-slotted MAC approach over the DCF-based standard MAC layer. On the other hand, the next generation Wi-Fi networks, driven by the IEEE 802.11ax standard, supports a number of enhancements that improve the performance in dense environments. One of the key features of IEEE 802.11ax is the adoption of orthogonal frequency division multiple access (OFDMA), in both downlink and uplink, for realising multi-user transmissions. This is a major change as compared to previous 802.11 generations which were based on OFDM. OFDMA offers many benefits for industrial communication. First, it makes transmissions more resilient to frequency selection fading and interference. Second, OFDMA allows partitioning of wide channels into small channels which is ideal for low bandwidth applications. Third, OFDMA enables multi-user transmissions which reduce latency in communication. Last, but not least, OFDMA enables more efficient use of resources as compared to OFDM. The embodiment described in the following uses another MAC design that relies on OFDMA to build a virtual time-slotted schedule.

A MAC design of an embodiment exploits some of the key features of next generation Wi-Fi standard in providing a virtual TDMA functionality. One such feature is the multi-user transmission which is enabled by OFDMA. With OFDMA, the conventional Wi-Fi channel can be split into multiple non-overlapping sub-channels. These sub-channels can be allocated to multiple users which can transmit in parallel. Such multi-user transmissions can be supported in both downlink and uplink. The embodiment may moreover use trigger frames to support multi-user transmissions. In the embodiment trigger frames are used to signal a group of users to engage in a multi-user transmission.

The MAC design of the present embodiment relies on temporal redundancy for achieving high reliability. For this purpose each STA 310/320 is simultaneously associated with two APs 120/130. The embodiment adapts the same dual AP association mechanism described above in the context of the first embodiment.

In the embodiment the MAC layer design uses different types of OFDMA frames. Unlike the MAC designs described above, there is no pre-defined allocation of timeslots for such frames. Let, $W_{CH}$ denote the Wi-Fi channel bandwidth, $W_S$ the sub-channel bandwidth and K the number of devices/STAs 310/320 in the network. The number of devices/STAs 310/320 that can be simultaneously supported is given by $N=W_{CH}/W_S$. For instance, with a channel bandwidth of 20 MHz and a sub-channel bandwidth of 2.22 MHz, 9 devices/STAs 310/320 can be simultaneously supported.

Figure 6:
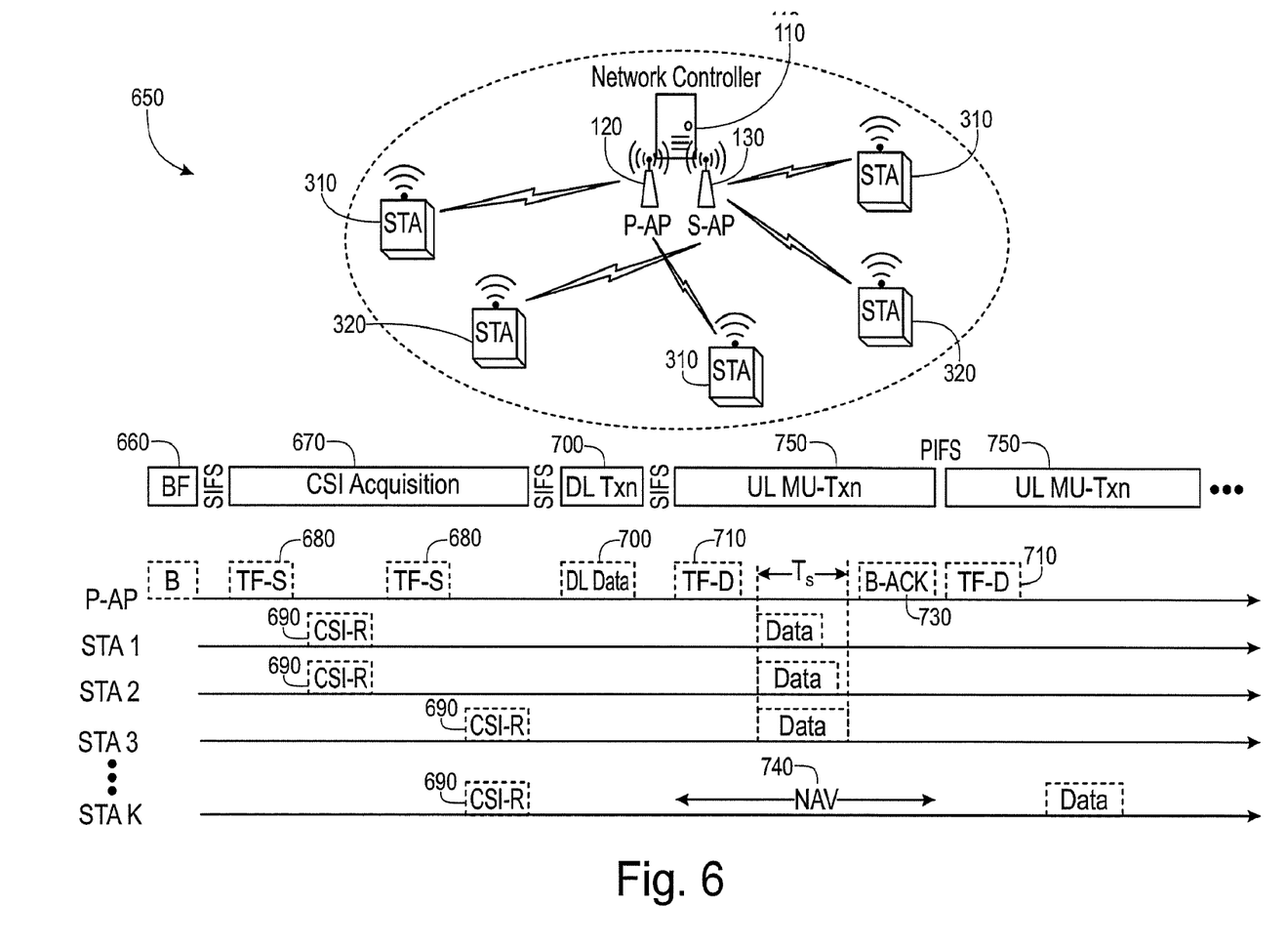
FIG. 6 shows part of a fourth embodiment of transmitting data to two access points.

The MAC layer operation is explained with reference to FIG. 6. FIG. 6 shows the timeline of the interaction between P-AP 120 and the STAs 310 in the network. Initially, the P-AP 120 transmits beacon frame 660 which contains network and synchronization information. In order to realise rate adaptation functionality the P-AP 120 acquires the channel state information (CSI) of STAs 310 in the network in the next frame 670. The frequency of obtaining the CSI is dependent on the nature of the environment. The CSI can also be exploited to select the best users for multi-user transmissions.

After waiting for a short interframe space (SIFS) duration, the P-AP 120 transmits a trigger frame 680. The trigger frame solicits CSI from a group of STAs 310. It includes information about the users involved in the multi-user transmission along with the user-specific information e.g., sub-channel allocation information. As a response to trigger frame 680, the STAs 310 send their CSI reports 690, after waiting for a SIFS duration. It should be noted that multiple trigger rounds might be needed to gather information from all STAs in the network. After acquiring the CSI information, the P-AP 120 can schedule uplink and downlink transmissions.

For industrial control applications, the cycle of transmission may start with command signals from the controller 110. Therefore, downlink transmissions 700 precede uplink transmissions. The downlink transmission 700 by the P-AP 120 takes place after waiting for SIFS duration from end of the CSI Acquisition phase 670. Similar to beacon frames 660, the downlink transmissions can be sent as broadcast. However, the P-AP 120 can also perform multi-user downlink transmissions. A trigger frame is not required for downlink transmission as it is initiated by the P-AP 120.

After waiting for a SIFS duration from the end of downlink transmission 700, the P-AP 120 transmits a trigger frame 710 for scheduling multi-user uplink transmission. This trigger frame 710 is different from the one (680) sent for acquiring CSI. The trigger frame 710 contains information about the STAs 310 involved in the multi-STA 310 transmission along with STA-specific information including the allocation of sub-channels and modulation and coding scheme. Each multi-STA 310 transmission must finish at the same time. In this respect, the trigger frame 710 also contains an optimal scheduling duration parameter, which is denoted by $T_s$. The STAs 310 are configured so that those STAs 310 with a transmission duration less than $T_s$ append padding bits to end the transmission 720 at the same time as other STAs 310. Although the payload for most industrial applications can be fixed, variations in transmission time can occur due to the aforementioned rate adaptation functionality. After waiting for a SIFS duration, the P-AP 120 transmits a block ACK 730 to all the STAs 310 engaged in multi-user transmission.

The STAs which are not part of the multi-user transmission set their network allocation vector 740 (NAV) to the duration advertised in the trigger frame. The NAV is an indicator for a STA 310/320 on how long it must defer from accessing the medium. To further protect uplink transmissions, the P-AP 120 can also utilise a multi-user request-to-send/clear-to-send (RTS/CTS) method.

Multiple multi-user uplink transmissions 750 might be needed as part of a control cycle. Each multi-user uplink transmission 750 is separated by a PIFS duration. The PIFS duration ensures that the P-AP 120 has priority in channel access as STAs 310/320 who have set their NAV 740 during the previous multi-user uplink transmission 750 will wait for a DIFS duration before next contention.

In the following the manner in which temporal redundancy is achieved in the embodiment is discussed. After finishing the first multi-user uplink transmission 750, the P-AP 120 exchanges the list of successful STAs 310/320 with the wireless controller 110. The wireless controller 110 shares this information with the S-AP 130. The group of STAs 310/320 which were part of the first multi-STA uplink transmission 750 perform a channel switching operation so that they start to communicate with the S-AP 130. To account for this channel switching operation, the operation of S-AP 130 starts after a HIFS duration from the end of the first multi-user uplink transmission 750. The S-AP 130 performs a similar operation as the P-AP 120, i.e., it transmits beacons 660, acquires CSI 670, performs downlink transmission 700, and schedules multi-user uplink transmissions 750. However, it only engages in transmission with the STAs 310/320 which have finished their multi-user transmission with the P-AP 120. The detailed operation of the S-AP 130 is illustrated through FIG. 7.

Figure 7:
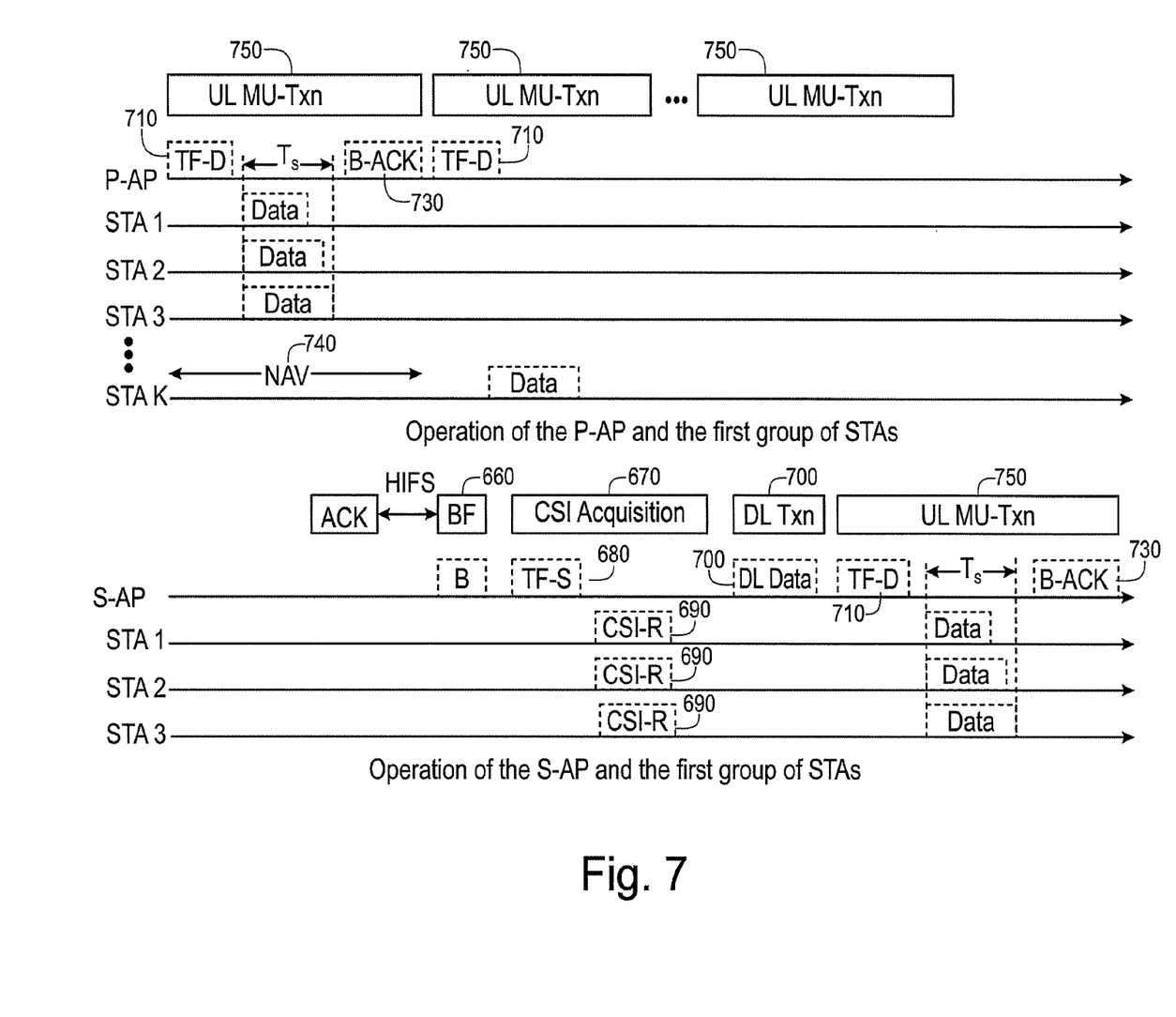
FIG. 7 shows another part of the fourth embodiment.

Finally, the MAC layer retransmissions can be handled through the P-AP 120. After completing the transmission with the S-AP 130, each STA 310/320 performs a channel switching operation to that of the P-AP 120. The P-AP 120 handles any retransmissions using the aforementioned strategy of using trigger frames.

The above described fourth embodiment provides a virtual TDMA functionality that achieves the benefits of TDMA without the overhead of computing and distributing the schedule. It also enables seamless integration of multi-antenna techniques, e.g., multi-user MIMO which further improve the efficiency through multiplexing of users in another dimension. Further, it facilitates the integration of different traffic types with varying service requirements. This is particularly attractive for next generation industrial networks.

All of the above embodiments are also beneficial from an energy-efficiency perspective as nodes can be easily duty-cycled by their respective inclusion and/or exclusion from transmission schedules.

Calculation of Optimal Scheduling Time for the Virtual TDMA MAC Design

The calculation of the optimal scheduling time Ts is illustrated by Table 2.

TABLE 2

Algorithm for calculation of optimal scheduling time for fixed uplink payload

Input: (i) Set of modulation and coding schemes denoted by M;
(ii) Net payload of uplink data transmission for each STA denoted by P;
(iii) Set of STAs for the multi-user transmission denoted by $K_s$;
(iv) Set of CSI reports from the STA engaged in multi-user transmission denoted by $C_s$;
(v) Mapping table for modulation and coding scheme and CSI;

Step 1: Based on $C_s$, find the STA k with the lowest signal-to-noise ratio (SNR) denoted by $S_k$
Step 2: Map $S_k$ to the appropriate modulation and coding scheme in M.
Step 3: Calculate the data rate for the STA k as $R_k = W_s \log_2(1 + S_k)$
Step 4: Calculate optimal scheduling time $T_s$ as $\text{ceil}(P/R_k)$ where cell(.) denotes the smallest integer greater than or equal to the value.

The CSI report 690 from a particular STA 310/320 provides information of channel quality, e.g., in terms of received signal-to-noise ratio (SNR) to the AP (P-AP 120 or S-AP 130). In practice, there is only a discrete finite set M of available modulation and coding schemes which would be supported by the AP 120/130. The AP 120/130 selects the STA 310/320 with the lowest received signal-to-noise-ratio (SNR) based on the received CSI reports 690. Further, based on the CSI reports 690 during the CSI acquisition period 670, the AP 120/130 selects the appropriate modulation and coding scheme for each STA 310/320 to realize the rate adaptation functionality. For the sake of calculation of Ts the AP 120/130 identifies the STA k with the lowest SNR. Further, based on the net payload for the uplink transmission, the AP 120/130 calculates the data rate for user k as shown in Table 2.

For many control applications, the payload can be fixed. However, the proposed algorithm can be modified to account for variation in payload per transmission. In this case, the AP 120/130 calculates the transmission time for each STA 310/320 depending on the assigned modulation and coding scheme and the uplink payload, and finds the optimal scheduling time as the maximum of the calculated values. This is illustrated in Table 3.

TABLE 3

Algorithm for calculation of optimal scheduling time for variable uplink payload Input: (i) Set of modulation and coding schemes denoted by M;
(ii) Set of the net payload of uplink data transmission for each STA denoted by P;
(iii) Set of STAs for the multi-user transmission denoted by $K_s$;
(iv) Set of CSI reports from the STA engaged in multi-user transmission denoted by $C_s$;
(v) Mapping table for modulation and coding scheme and CSI;

Step 1: Based on $C_s$, find the signal-to-noise ratio (SNR) for each STA
Step 2: Map SNR to the appropriate modulation and coding scheme in M for each STA
Step 3: Calculate the data rate for each STA as $R_i = W_s \log_2(1 + S_i)$
Step 4: Calculate optimal scheduling time $T_s$ as $\max [\text{ceil}(P1/R_i)]$ where cell(.) denotes the smallest integer greater than or equal to the value and max(.) denotes finding the maximum of the set of values.

Common to all of the above embodiments is that no handover process is required when a node completes data transmission to one access point and starts data transmission with another access point.

Calculation of TTT in the TDMA Over DCF, TDMA Over DCF with PCF and Window-Based DCF MAC Designs As discussed above with reference to FIG. 2, during association between STAs and the S-AP the association request frame 240 to the S-AP contains the TTT parameter. This parameter which indicates the minimum duration for which the STA will not transmit or receive from the S-AP for the first time after association. The duration after which a STA starts communicating with the S-AP actually depends on the number of groups and the specific group to which the STA belongs and also the superframe length. In some embodiments no a priori knowledge of grouping is available to the STAs during the association phase. In this case the TTT parameter transmitted may simply indicate that the STA will not attempt transmission for the duration of one frame. The frame duration can (later) be calculated by the STA once it has acquired knowledge of the grouping calculated by the wireless controller. In an alternative embodiment the AP includes information indicating the grouping in the beacon frame and so that the STA can calculate the actual duration of the TTT parameter and return it to the STA.

Calculation of TTT for the Virtual TDMA MAC Design

In case of the virtual TDMA MAC design, the STAs set the TTT to a large number which will roughly account for one cycle of information without any retransmissions and accounting for the CSI acquisition phase and beacon frames. This information can be pre-computed by the wireless controller and updated during the association phase.

Overload Mitigation

In practice, a large number of STAs may try to associate to an AP at the same time resulting in an overload scenario in the network. This can occur, for example, after a power outage event in which information regarding authentication is retained. In an embodiment a hybrid (centralised plus distributed) mechanism for mitigating overload in such scenarios is adopted.

Consider the scenario where the cycle of communication was disrupted due to a power outage event. Once the power is restored, all the STAs need to re-associate with the APs. In an embodiment the APs advertise a parameter, termed as permission probability (p), through the beacon frames. The value of the permission probability can be selected based on the number of STAs in the network. For the first three above described MAC designs each STA takes a random backoff (in terms of timeslots) before sending an association request to the AP. The random backoff is uniformly distributed in the interval [0, 1, . . . , SN], such that the parameter SN is given by max(SN_P,SN_S) where SN_P and SN_S denote the timeslot allocated to the STA by the P-AP and the S-AP via their respective beacon frames. Once the backoff expires, the respective STA transmits with a probability p. If the transmission is unsuccessful, the STA repeats the backoff process.

In case of the virtual TDMA MAC design, the random backoff can be uniformly distributed in the interval [0, 1, . . . , $S_M$] such that the parameter $S_M$ is the uplink multi-user transmission as determined from the downlink transmission from the beginning of the cycle, i.e., the first uplink transmission, the second uplink transmission, and so on.

As will be appreciated the proposed protocol provide the following benefits of using temporal redundancy to improve reliability without requiring changes to the 802.11 standard. The methods disclosed herein can therefore be realised as an 'add-on' without having any impact on the backwards compatibility.

Figure 8:
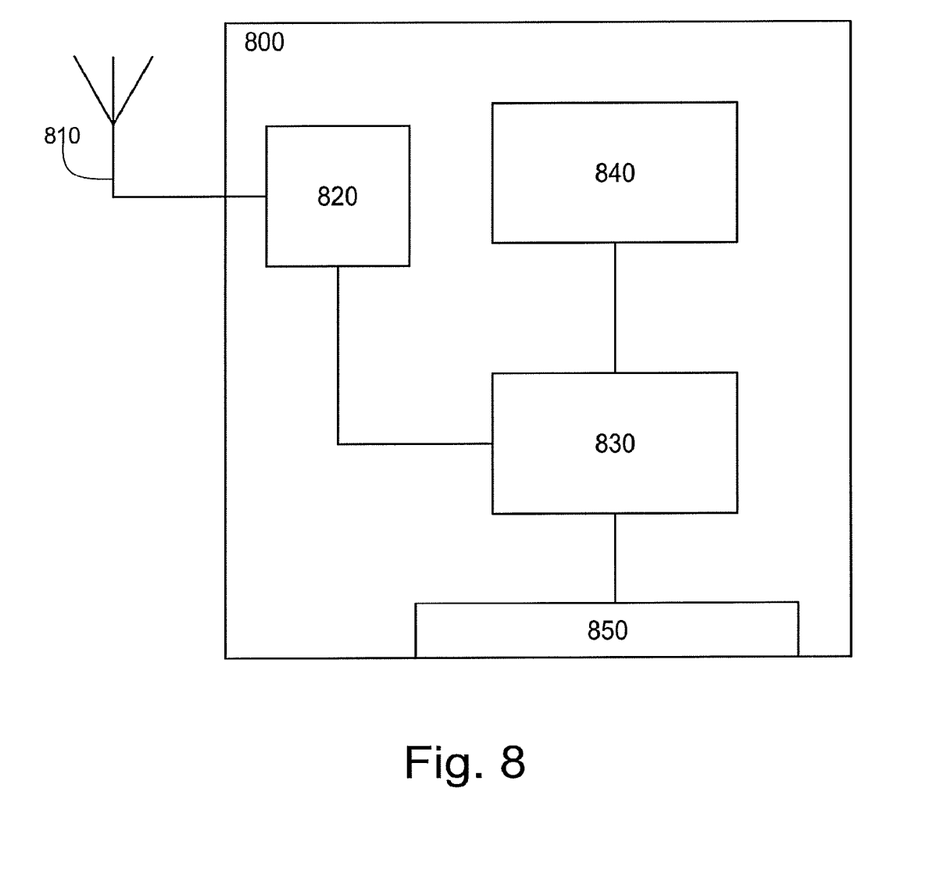
FIG. 8 shows a device for use in embodiments.

FIG. 8 shows a device 800 comprising one or more antennae 810 configured to transmit/receive data from/to processor 830 using transmit and/or receive chain 820. The processor 830 may be a microprocessor configured to operate on the basis of computer program instructions or a field programmable gate array. The device 800 may further comprise a memory 840 storing parameters or information required for the operation of the system of an embodiment. These parameters or information may either be pre-set or may be determined during the operation of the system of the embodiment and stored in the memory 840 during runtime. The memory 840 may, for example, store authentication information of individual nodes, indications of successful data transmissions etc. If the processor 830 is a microprocessor the memory 840 may also store computer program instructions for access and execution by the processor 830. The computer program instructions are such that they cause the device 800 to perform any of the above described methods when executed by the processor 830. The memory 840 may be volatile or non-volatile memory or may be read only, write once or re-writable memory.

The device 800 may be one of the access points 120 and 130. Alternatively the device 800 may form a node 310/320. If the device 800 is a node 310/320 then it does not comprise the data input/output port 850. The device may, further alternatively, be the wireless controller 110. If the device 800 forms the wireless controller 110 then it may not comprise the antenna 810 and transmit/receive chain 820. Instead all data exchange may be performed via the input/output port 850.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A method of operating a first access point, a second access point, a first communication apparatus, and a second communication apparatus corresponding to nodes in the same network, the method comprising:
associating the first communication apparatus with the first access point and the second access point, the first access point and the second access point being connected via a wired interface, association information for associating with one of the first communication apparatus or a second communication apparatus being shared between the first access point and the second access point via the wired interface;
associating the second communication apparatus with the first access point and the second access point using the association information;
receiving, by the first access point, first data from the first communication apparatus and the second communication apparatus within a first period according to first scheduled communication information included in a first beacon frame transmitted by at least one of the first access point or the second access point, the first scheduled communication information including information on data transmission to the first access point; and
receiving, by the second access point, at least part of the same data as the first data from the first communication apparatus and the second communication apparatus within a second period subsequent to the first period according to second scheduled communication information included in a second beacon frame transmitted by at least one of the first access point or the second access point, the second scheduled communication information including information on data transmission to the second access point.

2. A method as claimed in claim 1, further comprising determining one or more of nodes for which first data transmission to the first access point was successful and one or more nodes for which the second data transmission to the first access point was not successful; and
scheduling a re-transmission to the second access point only for nodes that were determined to have not succeeded in the second data transmission to the first access point.

3. A method as claimed in claim 1, wherein the scheduled communication information is provided to the nodes by at least one of the first access point, the second access point, or a network controller controlling the first and second access points.

4. A method as claimed in claim 1, wherein data transmission relies on OFDMA and wherein a schedule for data transmission is generated on the basis of channel state information acquired from nodes within the network.

5. A method as claimed in claim 4, wherein the nodes are configured to transmit data so that, under current transmission conditions, a predetermined transmission duration is met.

6. A method as claimed in claim 4, wherein one or more of the nodes is configured to transmit the channel state information to one of the first access point and the second access point, the one or more of the nodes receiving a request to provide the channel state information.

7. A method as claimed in claim 1, wherein one of the first access point and the second access point transmits information identifying the nodes scheduled for simultaneous data transmission to the nodes.

8. A method as claimed in claim 1, wherein one of the first access point and the second access point polls the nodes according to the scheduled communication information, where each node responds to a received polling message with data transmission to the one of the first access point and the second access point.

9. A method as claimed in claim 1, further comprising:
grouping the nodes in a plurality of groups;

performing first communication between the first access point and one or more nodes in a group while performing second communication between the second access point and one or more nodes in another group, the first communication and the second communication being performed in accordance with the scheduled communication information.

10. A method of operating a first access point, a second access point, a first communication apparatus, and a second communication apparatus corresponding to nodes in the same network, the method comprising:

associating the first communication apparatus with the first access point and the second access point, the first access point and the second access point being connected via a wired interface, association information for associating with one of the first communication apparatus or a second communication apparatus being shared between the first access point and the second access point via the wired interface;

associating the second communication apparatus with the first access point and the second access point using the association information;

transmitting data to the first access point by the first communication apparatus and the second communication apparatus according to first scheduled communication information included in a first beacon frame transmitted by at least one of the first access point or the second access point, the first scheduled communication information including information on data transmission to the at least one of the first access point or the second access point; and subsequently re-transmitting the same data to the second access point by the first communication apparatus and the second communication apparatus according to second scheduled communication information included in a second beacon frame transmitted by at least one of the first access point or the second access point, the first scheduled communication information including information on data transmission to the at least one of the first access point or the second access point.

11. A method as claimed in claim 1, the associating the first communication apparatus comprising:

establishing security credentials of the first communication apparatus by authenticating the first communication apparatus with the first access point;

associating the first communication apparatus with the first access point;

forwarding the security credentials of the first communication apparatus to the second access point;

associating the first communication apparatus with the second access point.

12. A method as claimed in claim 11, wherein the first access point forwards security credentials of the first communication apparatus that is being or has been authorised for participating in the network to the second access point.

13. A method as claimed in claim 1, further comprising:

sending an authentication request to one of the first access point and the second access point;

following successful authentication with the first access point, associating with both the first access point and the second access point without first sending an authentication request to the second access point.

14. A non-transitory computer readable medium storing a computer program operating a first access point, a second access point, a first communication apparatus, and a second communication apparatus corresponding to nodes in the same network, the program being executed by a computer to provide:

associating the first communication apparatus with the first access point and the second access point, the first access point and the second access point being connected via a wired interface, association information for associating with one of the first communication apparatus or a second communication apparatus being shared between the first access point and the second access point via the wired interface;

associating the second communication apparatus with the first access point and the second access point using the association information;

receiving, by the first access point, first data from the first communication apparatus and the second communication apparatus within a first period according to first scheduled communication information included in a first beacon frame transmitted by at least one of the first access point or the second access point, the first scheduled communication information including information on data transmission to the first access point; and receiving, by the second access point, at least part of the same data as the first data from the first communication apparatus and the second communication apparatus within a second period subsequent to the first period according to second scheduled communication information included in a second beacon frame transmitted by at least one of the first access point or the second access point, the second scheduled communication information including information on data transmission to the second access point.

15. A method of operating a first access point, a second access point, a first communication apparatus, and a second communication apparatus corresponding to nodes in the same network, the method comprising:

associating the first communication apparatus with the first access point and the second access point, the first access point and the second access point being connected via a wired interface, association information for associating with one of the first communication apparatus or a second communication apparatus being shared between the first access point and the second access point via the wired interface;

associating the second communication apparatus with the first access point and the second access point using the association information;

receiving, by the first access point, first data from the first communication apparatus within a first period according to first scheduled communication information included in a first beacon frame transmitted by at least one of the first access point or the second access point, the first scheduled communication information including information on data transmission to the first access point;

receiving, by the second access point, the first data from the first communication apparatus within a second period subsequent to the first period according to second scheduled communication information included in a second beacon frame transmitted by at least one of the first access point or the second access point, the second scheduled communication information including information on data transmission to the first access point and the second access point;

receiving, by the first access point, second data from the second communication apparatus within the second period according to the second scheduled communication information included in the second beacon frame; and receiving, by the second access point, the second data from the second communication apparatus within the a third period subsequent to the second period according to third scheduled communication information included in a third beacon frame transmitted by at least one of the first access point or the second access point, the third scheduled communication information including information on data transmission to the second access point.

\* \* \* \* \*